United States Patent
Eschholz et al.

(10) Patent No.: US 8,788,076 B2
(45) Date of Patent: *Jul. 22, 2014

(54) DISTRIBUTED SWITCHING SYSTEM FOR PROGRAMMABLE MULTIMEDIA CONTROLLER

(75) Inventors: Siegmar K. Eschholz, Southwest Harbor, ME (US); Michael C. Silva, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 1579 days.

This patent is subject to a terminal disclaimer.

(21) Appl. No.: 11/687,500

(22) Filed: Mar. 16, 2007

(65) Prior Publication Data

US 2008/0228934 A1 Sep. 18, 2008

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | | | |
|---|---|---|---|---|
| 4,710,917 A * | 12/1987 | Tompkins et al. | ............ | 709/204 |
| 5,675,390 A * | 10/1997 | Schindler et al. | ............. | 715/717 |
| 5,937,176 A | 8/1999 | Beasley et al. | | |
| 6,202,211 B1 | 3/2001 | Williams, Jr. | | |
| 6,522,646 B1 * | 2/2003 | Madonna | ....................... | 370/353 |
| 6,711,647 B1 * | 3/2004 | Holehan | ........................ | 710/306 |
| 6,892,167 B2 * | 5/2005 | Polan et al. | .................... | 702/187 |
| 7,668,964 B2 * | 2/2010 | Millington | .................... | 709/231 |
| 7,690,017 B2 * | 3/2010 | Stecyk et al. | .................... | 725/80 |
| 8,266,516 B2 * | 9/2012 | Hiroi et al. | ..................... | 715/211 |
| 8,335,576 B1 * | 12/2012 | Bradshaw et al. | .............. | 700/94 |
| 8,396,578 B2 * | 3/2013 | Miyata et al. | ................... | 700/94 |
| 2003/0055635 A1 * | 3/2003 | Bizjak | ........................... | 704/225 |
| 2003/0170009 A1 * | 9/2003 | Itoh et al. | ....................... | 386/111 |
| 2004/0054689 A1 * | 3/2004 | Salmonsen et al. | ......... | 707/104.1 |
| 2005/0041604 A1 * | 2/2005 | Tighe et al. | .................... | 370/263 |
| 2005/0237952 A1 * | 10/2005 | Punj et al. | ..................... | 370/260 |
| 2006/0165385 A1 * | 7/2006 | Aoki | .............................. | 386/112 |
| 2006/0215630 A1 * | 9/2006 | Hwang et al. | .................. | 370/351 |
| 2006/0233120 A1 | 10/2006 | Eshel et al. | | |
| 2006/0248173 A1 * | 11/2006 | Shimizu | ......................... | 709/220 |
| 2007/0091906 A1 * | 4/2007 | Croy et al. | ..................... | 370/401 |
| 2007/0143801 A1 * | 6/2007 | Madonna et al. | ............... | 725/80 |
| 2009/0089813 A1 * | 4/2009 | Wihardja et al. | ............... | 719/322 |

FOREIGN PATENT DOCUMENTS

EP 1 589 699 A2 10/2005
WO WO-02/17566 A1 2/2002

OTHER PUBLICATIONS

Yamaha DME Designer Manual Copyright 2004.*
ProTools7.0 Manual copyright 2005.*
"Notification of Transmittal of the International Search Report and the Written Opinion of the International Searching Authority, or the Declaration," International Filing Date: Mar. 14, 2008, International Application No. PCT/US2008/003441, Applicant: Savant Systems, LLC., Date of Mailing: Apr. 29, 2009, pp. 1-19.

* cited by examiner

*Primary Examiner* — Paul McCord
(74) *Attorney, Agent, or Firm* — Cesari and McKenna, LLP

(57) ABSTRACT

A distributed switching system for use with a programmable multimedia controller. In the system, data streams originating from the controller or any of a plurality of devices interconnected with the controller are accessible by the other devices which may switch the streams as needed.

18 Claims, 9 Drawing Sheets

DISTRIBUTED SWITCHING SYSTEM FOR PROGRAMMABLE MULTIMEDIA CONTROLLER

RELATED CASES

This application is related to the following copending United States Patent Applications: SYSTEM AND METHOD FOR A PROGRAMMABLE MULTIMEDIA CONTROLLER, filed Dec. 20, 2005 and assigned Ser. No. 11/314,664, and PROGRAMMABLE MULTIMEDIA CONTROLLER WITH PROGRAMMABLE SERVICES, filed Dec. 20, 2005 and assigned Ser. No. 11/314,112, the teachings of which are expressly incorporated herein by reference.

BACKGROUND OF THE INVENTION

1. Field of the Invention

The present invention relates generally to a distributed switching system in which programmable multimedia controllers and other devices may have shared access to data streams originating from any of the interconnected controllers and devices.

2. Background Information

The above-referenced related applications disclose a programmable multimedia controller as well as a wide variety of diverse, multimedia services that such a controller may be programmed to perform. In considering how much switching capacity to include in a single controller, there are numerous tradeoffs among performance, software development cost and complexity, product cost and physical size, and expandability. While a single large, central switch has its advantages, that approach tends to make the finished product larger and to significantly increase the base cost, possibly to the extent of undesirably limiting the market. A single large, central switch may also negatively impact add on sales because the incremental cost of additional capacity is high.

One way to address the cost and size issues is to select a smaller, less expensive switch. However, in order to provide the desired switching capacity as well as expandability, it will likely be necessary to connect multiple controllers together. Consequently, the smaller switch approach tends to require the addition of some type of interconnection or networking mechanism as well as development of more complex control software to coordinate the operations of multiple controllers.

SUMMARY OF THE INVENTION

In brief summary, the present invention provides a distributed switching system for a programmable multimedia controller in which data streams originating from any of a plurality of interconnected devices are accessible by the other devices. As a result, the present invention eliminates the need for a single large, centralized switch to receive and switch all data streams. This advantageously enables individual multimedia controllers and other devices to be constructed with reduced hardware, at a significantly lower cost and smaller size, yet preserves the ability to easily expand system capacity as desired.

In accordance with one aspect of the invention, any of two or more interconnected programmable multimedia controllers and other devices may function as a source of audio streams, while having access to audio streams which originate from any other interconnected controller or device. Through FireWire®, Ethernet or other suitable interconnections, an audio stream which originates at any given controller or device is passed in an essentially point-to-point fashion to an adjacent controller or device. There, the audio stream is passed along to the next successive interconnected controller or device, if one is present, but the stream may also be switched to a local output device such as speakers, personal media players and the like.

In accordance with another aspect of the invention, any interconnected multimedia controller or device, depending upon its capabilities, may be programmed or assigned to perform particular higher level functions or tasks for purposes of load balancing, to take advantage of capabilities which are available in some controllers or devices but not others, convenience or ease of system administration. For example, a particular controller may include or have access to a data storage subsystem which holds a collection of digital music. Using the present invention, the particular controller or device may be programmed or assigned to act essentially as a music server, enabling users located in different rooms of a house to listen to different desired songs at the same time, while avoiding duplication of the storage subsystem or making multiple copies of the music collection.

An additional advantage of the present invention is that any device having an interface compatible with the interconnections may function as a data stream source. Thus, if FireWire® or Ethernet interconnections are used, any device with a FireWire® or Ethernet output may function as a data stream source available for distribution to all interconnected controllers and other devices.

BRIEF DESCRIPTION OF THE DRAWINGS

The invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
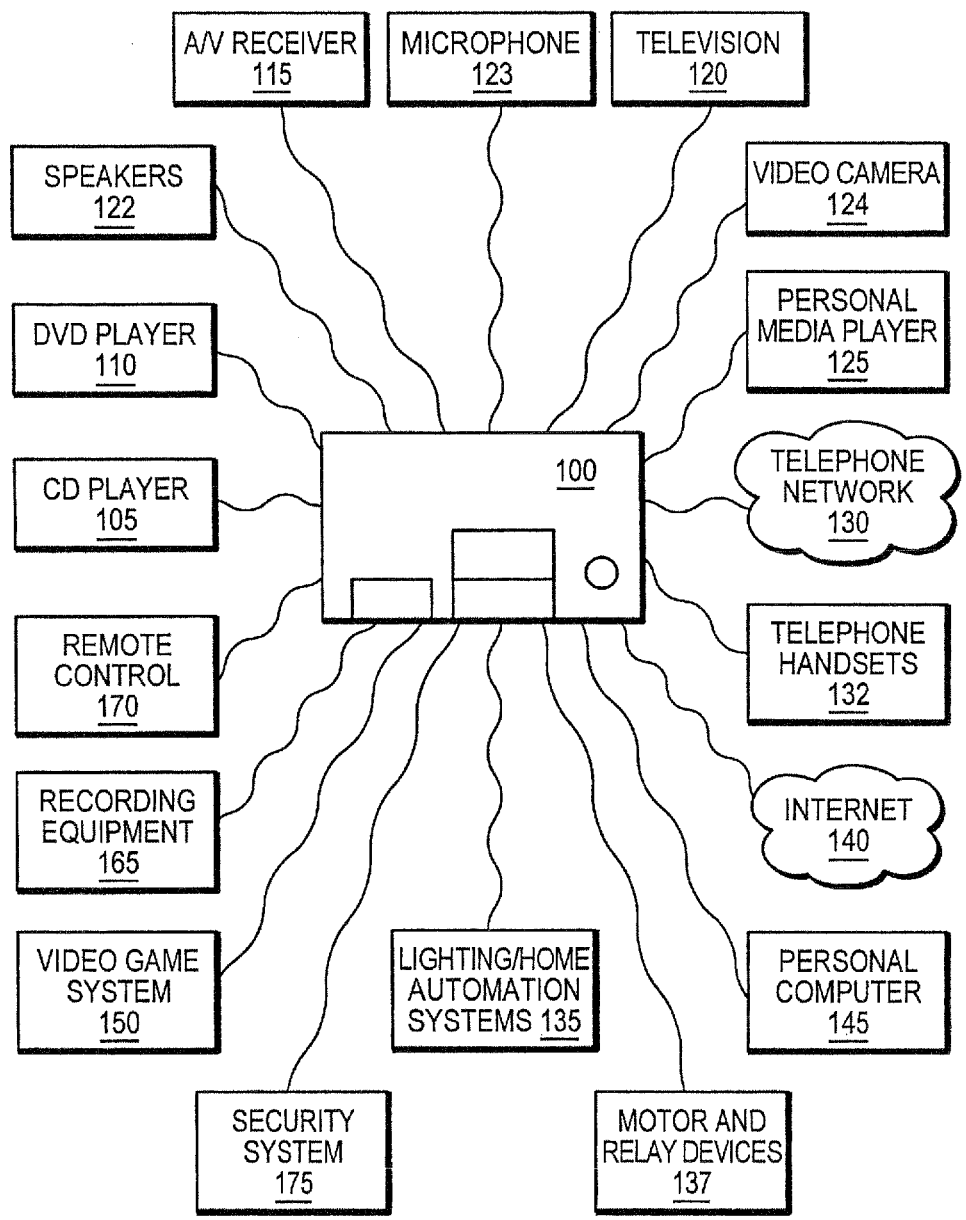
FIG. 1 is a block diagram of a programmable multimedia controller, interconnected to a number of devices, according to an illustrative embodiment of the present invention.

FIG. 1 is a block diagram of a programmable multimedia controller 100, interconnected to a number of devices, according to an illustrative embodiment of the present invention. The term "programmable multimedia controller" should be interpreted broadly as a device capable of controlling, switching data between, or otherwise interoperating with, a variety of electronic devices, such as audio, video, telephony, data, security, motor-operated, relay-operated or other types of devices. By interacting with these devices, the programmable multimedia controller 100 may implement an integrated multimedia control solution.

In the illustrative embodiment, the programmable multimedia controller 100 is connected to a wide range of audio/video components, for example, a compact disk (CD) player 105, a digital video disc (DVD) player 110, an audio/video receiver 115, a television 120, speakers 122, a microphone 123, a video camera 124 and a personal media player 125. The programmable multimedia controller may also be connected to telephony devices such as a telephone network 130 and telephone handsets 132. The telephone network 130 may be a publicly switched telephone network (PSTN), an Integrated Services Digital Network (ISDN) or other communications network.

In addition, the programmable multimedia controller may intercommunicate with variety of lighting and/or home automation systems 135. These devices may operate via the X10 protocol developed by Pico Electronics, the INSTEON™ protocol developed by SmartHome, Inc, the CEBus standard managed by the CEBus Industry Council, RS232, or another well known automation or control protocol. Similarly, controller 100 may be connected to motor/relay operated devices 137 that may include, for example, a heating, ventilation and air conditioning (HVAC) system, an irrigation system, an automatic shade or blind system, an electronic door lock, or other types of devices.

A computer network, such as the Internet 140, is connected to the programmable multimedia controller 100. In addition, a personal computer (PC) 145, video game systems 150, home or studio recording equipment 165 or other devices may also be connected. Further, one or more remote control units 170 may be provided to manage the controller's functionality or to control devices connected to the controller. Such remote control units 170 may be interconnected to the controller via a wired network connection or a wireless connection such as an infra-red link, a radio-frequency link, a Bluetooth™ link, a ZigBee™ link, WI-FI, or another appropriate data connection.

In addition to providing interconnection among a wide variety of devices, the programmable multimedia controller 100 is able to combine, synthesize, and otherwise processes various data types to implement an integrated multimedia solution for a user. Reference is made to the copending application entitled PROGRAMMABLE MULTIMEDIA CONTROLLER WITH PROGRAMMABLE SERVICES, incorporated above by reference, for a detailed description of the various novel services and capabilities that are provided.

To facilitate the above described interconnections and processing, the programmable multimedia controller 100 may be arranged in a modular manner. For example, in one embodiment, the programmable multimedia controller 100 is arranged to have twelve separate input and output modules, each having a number of connection ports. The input and output modules are inserted into slots or module bays of the programmable multimedia controller 100. The modules interface with a mid-plane that provides connection to the rest of the system. By embracing a modular approach, a user is allowed to select the specific modules desired, and the system may be customized to fit a particular application. In addition, entry level pricing may be reduced by allowing a user to purchase a base configuration, with limited capabilities, and then add to the system by purchasing additional modules. It is expressly contemplated that a wide variety of additional modules may be provided, and, accordingly, this disclosure should be interpreted to embrace such other possible configurations. It is also contemplated that several programmable multimedia controllers may be interconnected to create a larger system, in effect implementing a modular-type solution at the controller level.

Figure 2:
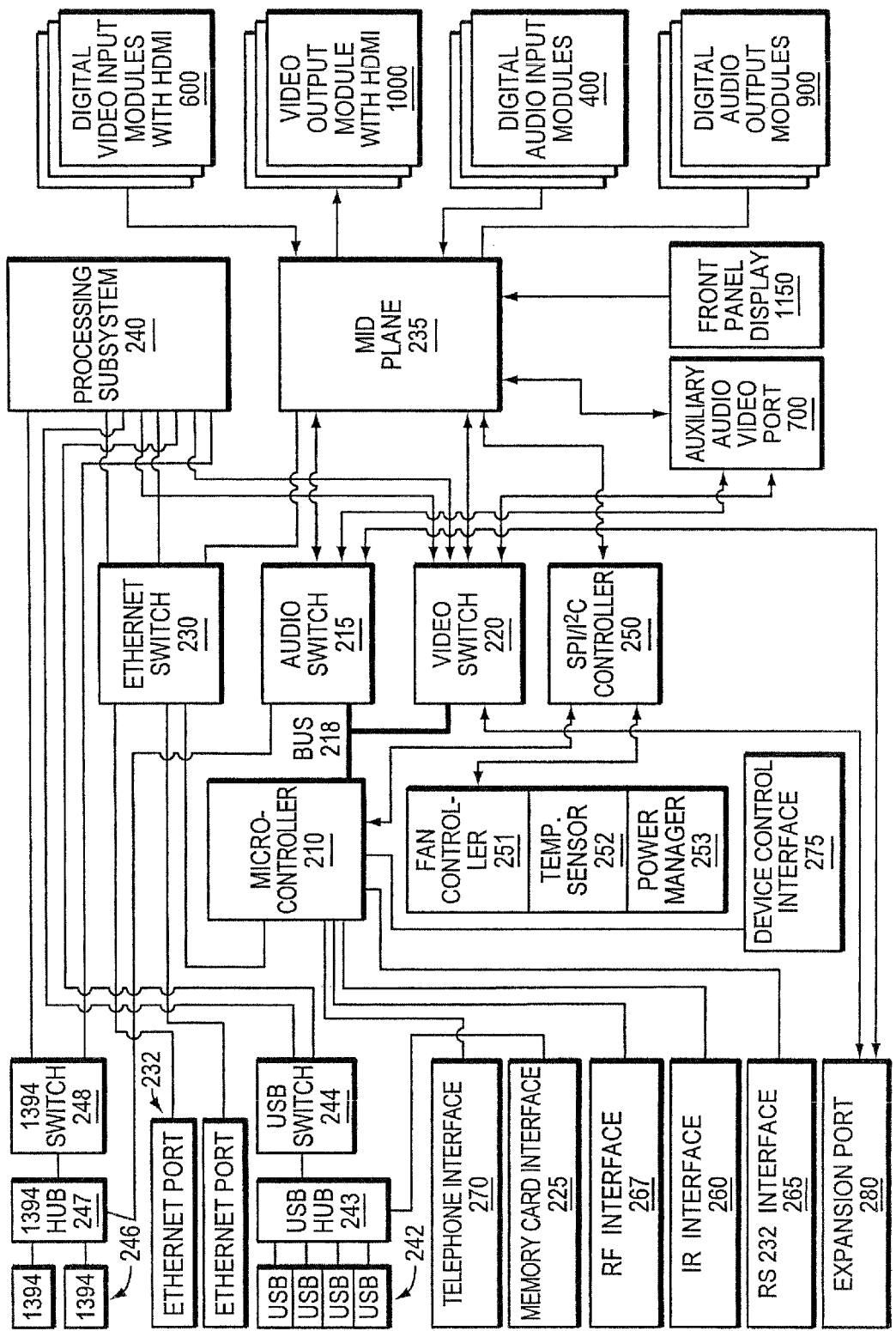
FIG. 2 is a schematic block diagram showing a high-level hardware architecture of the programmable multimedia controller.

FIG. 2 is a schematic block diagram showing a high-level hardware architecture of the programmable multimedia controller. The various components shown may be arranged on a "motherboard" of the controller, or on a plurality of cards interconnected by a backplane (not shown). A microcontroller 210 manages the general operation of the system. In the illustrative embodiment, the microcontroller is a 32-bit model MCF5234 microcontroller available from Freescale Semiconductor Inc. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals may be employed, for example Time Division Multiplexing (TDM) switches or other devices.

A mid plane 235 interconnects the switches to a variety of input and output modules such as, for example, Digital Video Input Modules with HDMI 600, Video Output Modules with HDMI 1000, Digital Audio Input Modules 400, and Digital Audio Output Modules 900. The mid plane 235 is further coupled to an Ethernet switch 230 that permits switching of 10BaseT, 100BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media.

Also, a number of Universal Serial Bus (USB) ports 242 are interconnected to a USB hub 243 for interconnection to the processing subsystem 240. A memory card interface 225 may also be connected to the USB hub 243. The interface accepts one or more well-known memory card formats, for example CompactFlash™ cards, Memory Stick™ cards, Secure Digital™ (SD) cards, or other formats. A USB switch 244 is employed to switch USB links among the multiple processing components that may be present in the processing subsystem 240. In a similar manner, a number of IEEE 1394 (also known as FireWire®) ports 246 are interconnected to an IEEE 1394 hub 247 and to an IEEE 1394 switch 248.

The microcontroller 210 is further connected to a Serial Peripheral Interface (SPI) and Inter-Integrated Circuit (I²C) distribution circuit 250, which provides a serial communication interface to relatively low data transfer rate devices. The SPI/I²C controller 250 is connected to the mid-plane connector 235 and thereby provides control commands from the microcontroller 210 to the modules and other devices in the programmable multimedia controller 100. Further connections from SPI/I²C controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits programmable multimedia controller 100 to control external devices. In addition the interfaces may receive control signals that control the operation of the programmable multimedia controller itself. It is expressly contemplated that various other interfaces, including WI-FI, Bluetooth™, ZigBee™ and other wired and wireless interfaces, may be used with the multimedia controller 100.

In addition, an Auxiliary Audio/Video Port 700 is provided for interconnecting one or more video game systems, camcorders, computers, karaoke machines, or other devices. A telephone interface 270 is provided for connecting to the public switch telephone network or to a private network, and to connect to one or more telephone handsets. Further, a device control interface 275 is provided to communicate with lighting, home automation, and motor and/or relay operated devices. An expansion port 280 is provided for linking several programmable multimedia controllers together to form an expanded system.

Finally, a front panel display 1150 permits presentation of status, configuration, and/or other information to a user. In one embodiment the front panel display may accept video data originating from any input source connected to the system, such that a user may preview video content on the front panel display 1150. In another embodiment, the front panel display 1150 includes a touch sensitive screen, and a user may enter control selections by selecting icons or other representations on the screen. In this manner the front panel display 1150 may be used for control and configuration of the system.

Figure 3:
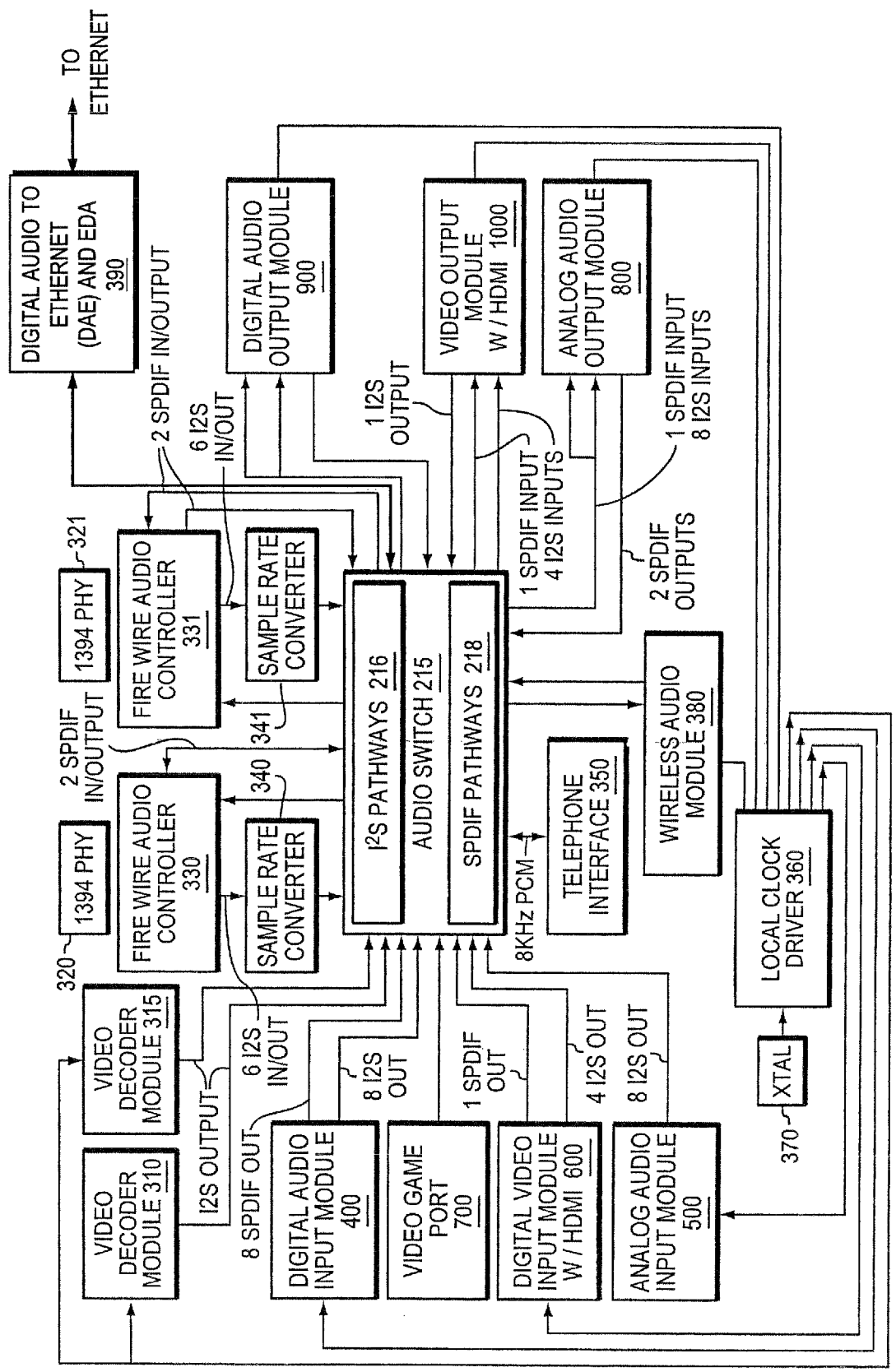
FIG. 3 is a schematic block diagram of an audio switch interconnected to a plurality of input and output modules in accordance with an illustrative embodiment of the present invention.

FIG. 3 is a schematic block diagram of the audio switch 215 interconnected to a plurality of input and output modules in an illustrative embodiment of the programmable multimedia controller 100. The audio switch 215 is preferably a Field Programmable Gate Array (FPGA) such as the Virtex-II Pro Field Programmable Gate Array, model XC2VPS-6FF672C, available from Xilinx, Inc. Alternately, the audio switch 215 switch may be another commercially available integrated circuit that is capable of simultaneously switching a plurality of signals.

The audio switch 215 is configured to accept a plurality of inputs from input modules, as well as audio streams that may be received from FireWire®, Ethernet or other interconnections or sources, and to switch these inputs to multiple outputs including audio output modules, interconnections or other devices which may be interfaced with the switch. Switching among audio inputs and outputs may occur on an individual basis, i.e., between a particular input and a particular output, or on a module-wide basis, where several inputs from a particular module are connected to several outputs leading to another module, from one input to multiple outputs, or in various other combinations.

Prior to transmission to the audio switch 215, audio signals are converted to common audio formats. The common format allows any input to be switched to any output. For example, all audio signals may be converted to the well known Sony/Philips Digital Interconnect Format (S/PDIF). Alternately, all audio signals may be converted the Inter-IC Sound (I²S) format. It will be apparent to one skilled in the art that a wide variety of other formats may be used, and accordingly this description should be taken by way of example. Similarly, a variety of combinations of multiple predetermined audio formats may be used. In the illustrative embodiment of the present invention, pulse code modulated (PCM) audio is sent as I²S signals, while encoded audio (non-PCM audio) is sent as SPDIF signals. The audio switch 215 is configured to switch both formats of signals employing separated 12S pathways 216 and SPDIF pathways 218.

In one embodiment, I²S signals may be used to transport non-standard audio data formats using a blank data frame technique. Input modules may send audio signals to one or more asynchronous sample rate converters, for example Cirrus Logic model CS8421 converters, that may insert blank frames between audio frames or over-sample the incoming audio data. In this manner non-standard bit rate signals may be converted to predetermined data transfer rate, such as 192K samples per second. An independent clock signal, indicating which frames contain actual audio data, and which frames are blank, may be switched along with the audio data to the output modules. At the output modules, the clock signal is used to separate the audio data from the blank frames, and to play back the audio at the proper rate. In this manner, the audio switch 215 may support a variety of non-standard audio bit rates with minimal additional circuitry.

In the illustrative embodiment, the audio switch 215 is connected to several input modules, such as a Digital Audio Input Module 400, an Analog Audio Input Module 500, Digital Video Input Module with High-Definition Multimedia Interface (HDMI) 600 and a Video Game Port 700. Similarly, the audio switch 215 is interconnected to several output modules including an Analog Audio Output Module 800, a Digital Audio Output Module 900, and a Video Output Module with HDMI 1000. In addition, a Wireless Audio Input Output Module 380 is interconnected to the switch. In one embodiment, the Wireless Audio Input Output Module 380 has a plurality of RF transceivers that operate in the 2.4 GHz ISM band, a number of types of which are commercially available. Such transceivers may send and receive up to a 1.54 MBit/s audio stream on each wireless data channel, thereby permitting interconnection with remote audio devices that utilized high quality audio data streams. The Wireless Audio Input Output Module 380 may also be used to send and receive control information.

As described in further detail below, additional audio interconnection is provided to the processing subsystem 240, via one or more IEEE 1394 connections and associated circuitry. A pair of IEEE 1394 physical layer cable transceiver/arbiters 320, 321, such as the model TSB41AB1 transceiver/arbiters available from Texas Instruments, Inc., provide physical networking layer functionality. Thereafter, data is passed to FireWire® audio controllers 330, 331, such as Oxford Semiconductor Inc. model OXFW971 controllers. Outputs from FireWire® audio controllers 330, 331 may pass either to S/PDIF transceivers (not show), such as ATK Inc. model AK4117 transceivers, for conversion into S/PDIF signals, or to sample rate converters 340, 341, such as model CS8421 asynchronous sample-rate converters, available from Cirrus Logic, Inc. Audio controllers 330, 331, in addition to transmitting and receiving digital audio streams, may optionally transmit and receive control information originating from or destined for processing subsystem 240 or other portions of programmable multimedia controller 100.

Further, one or more Video Decoder Modules 310, 315 are interconnected to the audio switch 215. The Video Decoder Modules 310, 315 may use specialized decoding circuits to offload video decoding tasks from the processing subsystem 240, and thereby enhance system performance. Modules 310, 315 may include MPEG or H264 decoders or encoders and the audio outputs from these modules are passed to audio switch 215.

Also, in the illustrative embodiment, audio switch 215 is interconnected to a telephone interface 350. Such an interface comprises Foreign eXchange Office (FXO) and Foreign eXchange Subscriber (FXS) circuitry for connection to Plain Old Telephone Service (POTS). The interface may also contain circuitry to permit direct connection of telephone handsets to the system.

Audio switch 215 is also interconnected with a digital audio to Ethernet/Ethernet to digital audio module 390. Module 390 receives digital audio streams from audio switch 215, and optionally control information, packetizes and transmits such data in accordance with Ethernet protocol. Module 390 also receives packetized digital audio streams and, optionally, control information from other Ethernet devices (not shown) which are interconnected with programmable multimedia controller 100. Module 390 depacketizes the digital audio streams and passes them to audio switch 215 where they may be switched as described above.

All modules are interconnected to a system clock driven by a local clock driver circuit 360. Such a circuit, in conjunction with a crystal oscillator (XTAL) 370, produces a local master clock that permits synchronous switching operation in the system.

Figure 4:
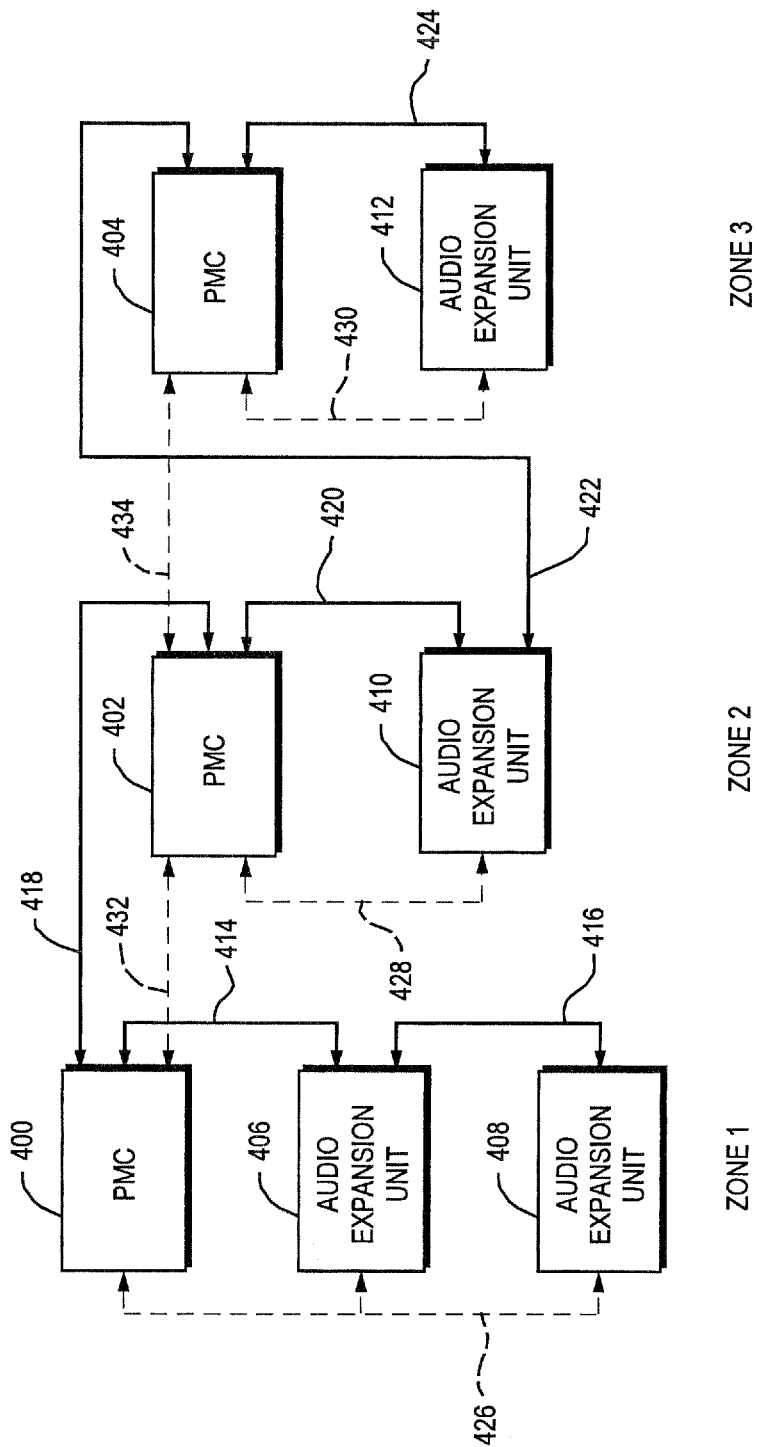
FIG. 4 is a schematic block diagram of multiple programmable multimedia controllers and audio expansion devices interconnected in a distributed switching arrangement, in accordance with an illustrative embodiment of the present invention.

FIG. 4 is a schematic block diagram showing a series of programmable multimedia controllers interconnected with several audio expansion units. Each of three programmable multimedia controllers 400, 402 and 404 typically contains the hardware shown in FIGS. 2 and 3. However, it should be understood that only a subset of the hardware shown in FIGS. 2 and 3 is needed to implement various embodiments of the present invention.

Several audio expansion units 406, 408, 410 and 412 are interconnected with controllers 400, 402 and 404 and arranged in three zones 1, 2 and 3. Each zone may represent, for example, a room, floor or other area in a residence or other building. Audio expansion units 406-412 may represent, for example, lower cost platforms for supporting additional audio input or output modules (FIG. 2) beyond those which can be directly connected to controllers 400-404. As described in more detail below, expansion units 406-412 do not typically require the complete set of hardware normally found in the controllers.

In a preferred embodiment, each interconnection 426-434 represents an Ethernet segment extending between two Ethernet ports such as ports 232 (FIG. 2). As described above, Ethernet segments 426-434 may be used to distribute digital audio streams or other data as well as control information originating at any of controllers 400-404 or expansion units 406-412 within and among zones 1, 2 and 3.

In a preferred embodiment, each interconnection 414-424 represents a FireWire® serial communication link extending between two physical layer cable transceiver/arbiters such as transceiver/arbiters 320, 321 (FIG. 3). In accordance with the FireWire® protocol, interconnections 414-424 may be used to distribute digital audio streams or other data as well as control information originating at any of controllers 400-404 or expansion units 406-412 within and among zones 1, 2 and 3.

The use of FireWire® to interconnect multiple controllers and audio expansion units provides numerous advantages. First, because FireWire® is supported by Apple, Inc. and FireWire® ports are built into most Mac computers, it is a readily available resource within a programmable multimedia controller that uses a Mac as its processing subsystem (FIG. 2). Second, with respect to audio data streams, FireWire® provides sufficient bandwidth to act as the functional equivalent of a backplane and distribute multiple data streams among devices that are physically separated by short distances. Third, FireWire® links may be implemented with conventional Category 5e twisted pair cable, which is widely available, inexpensive medium and the same medium typically used for Ethernet.

Figure 5A:
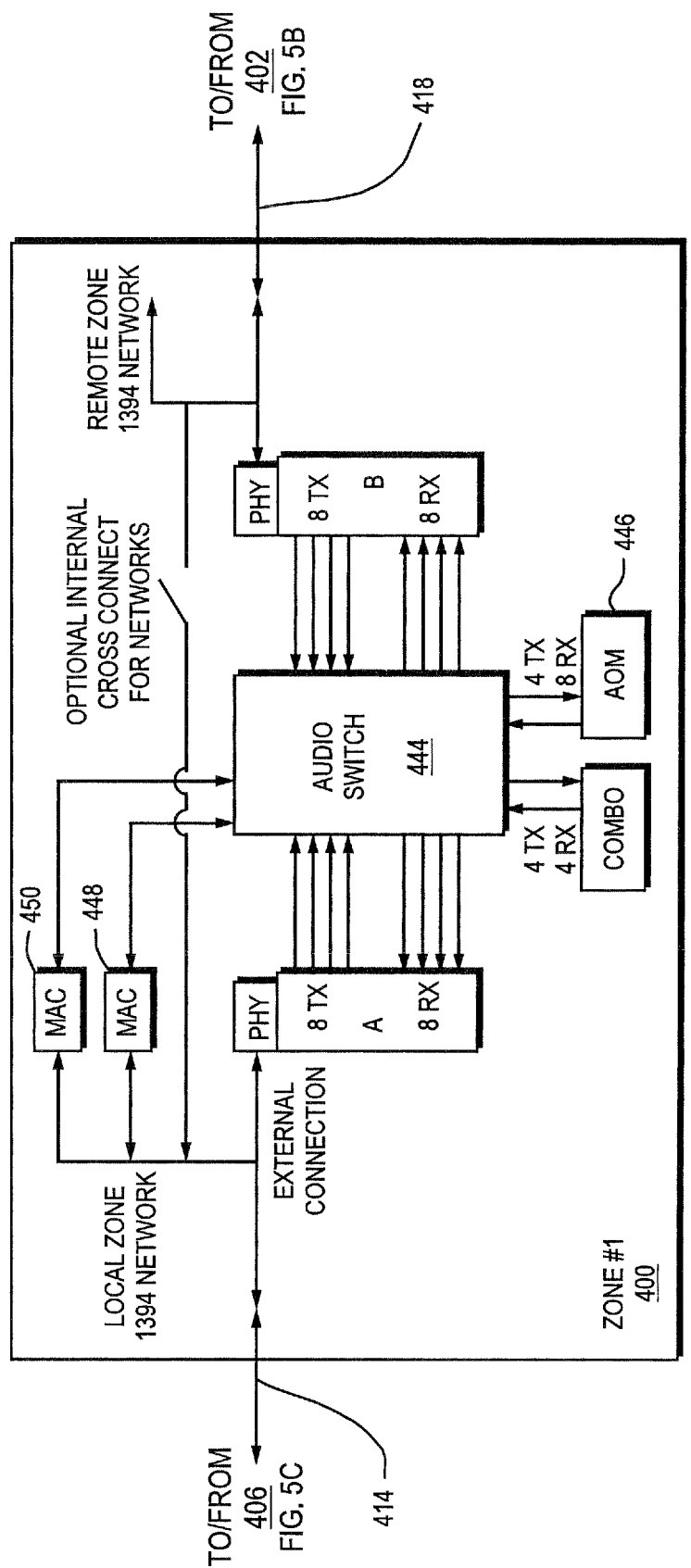
FIGS. 5A-5C are a more detailed block diagram of the controllers and audio expansion devices shown in FIG. 4.
Figure 5B:
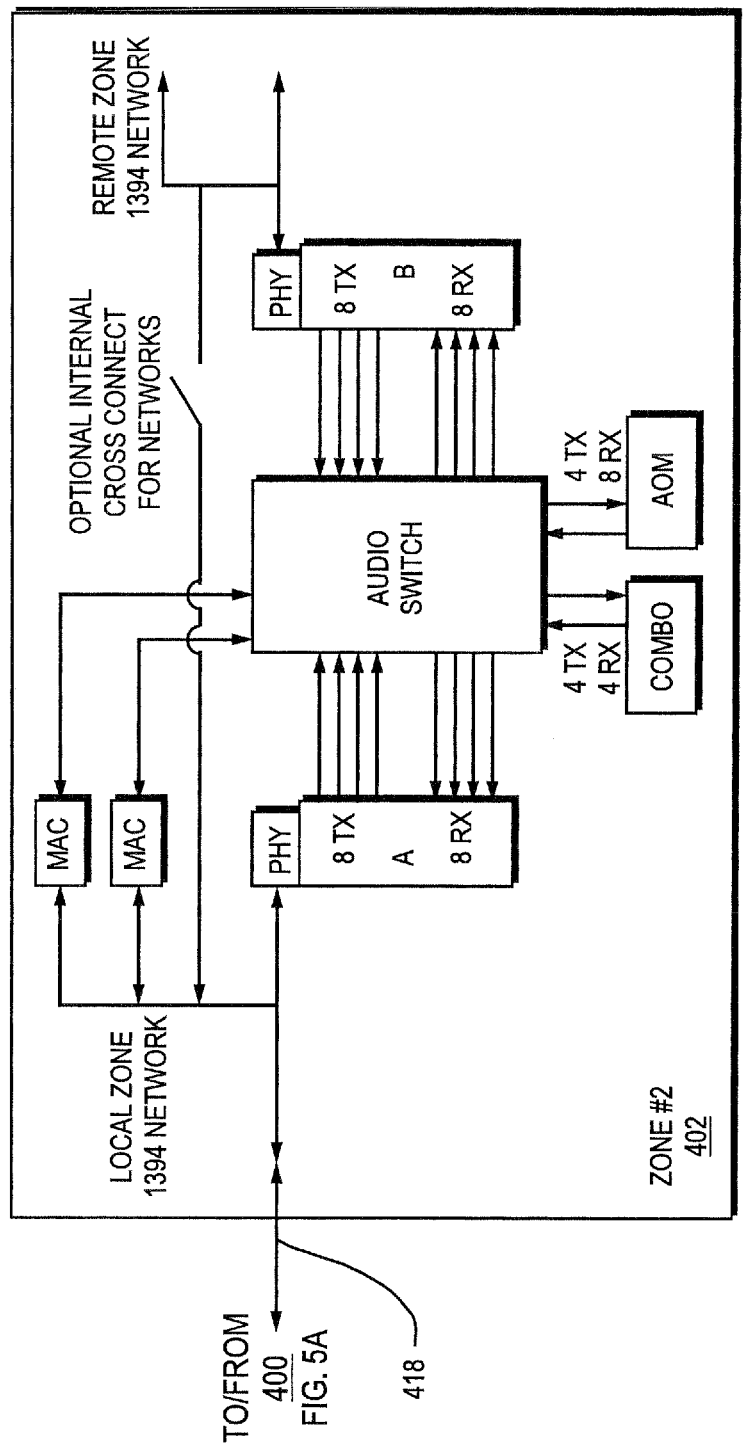
Figure 5C:
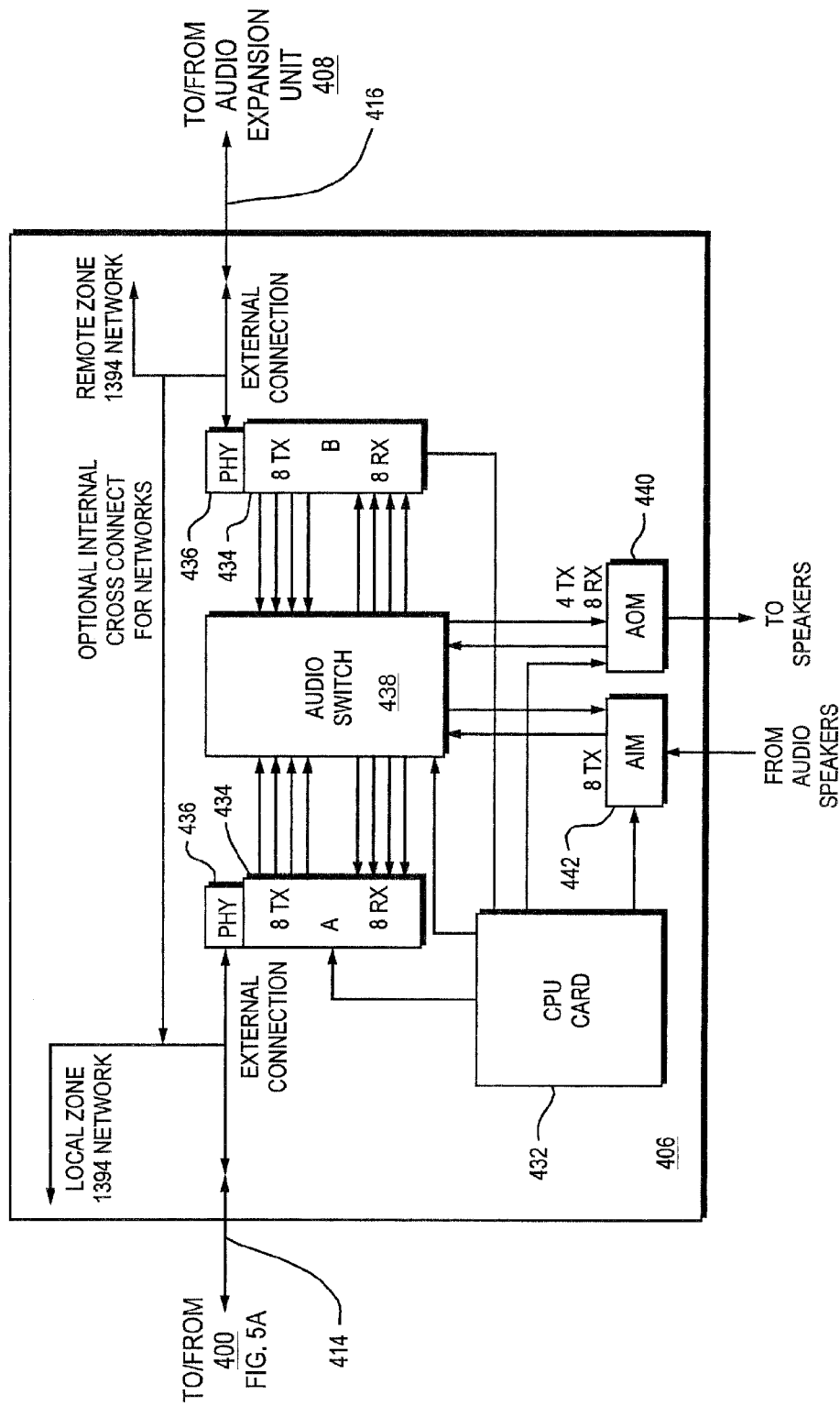

With reference now to FIGS. 5A-5C, the main components of a preferred embodiment of audio expansion unit 406 are shown. For purposes of enhanced clarity, Ethernet links and components not germane to the present invention are omitted.

A CPU card 432, which is preferably based on a Coldfire MCF5234 processor, includes memory and an Ethernet interface (not shown). FireWire® physical networking layer functionality is provided by a physical layer cable transceiver/arbiter 436, which is preferably model TSB41AB1 available from Texas Instruments, Inc. Under the control of CPU card 432, transceiver/arbiters 436 pass data to and from FireWire® audio controllers 434, which are preferably implemented with Oxford Semiconductor Inc. model OXFW971 controllers. An audio switch 438, which preferably implemented using an FPGA, is controlled by CPU card 432. A preferred FPGA is the Virtex-II Pro Field Programmable Gate Array, model XC2VPS-6FF672C, available from Xilinx, Inc. One or more audio output modules 440 and one or more audio input modules 442, either or both of which may be analog or digital (FIG. 3), are controlled by CPU card 432.

In operation, audio expansion unit 406 receives audio input from sources connected to audio input module 442. After conversion to a standard type of digital signal, as described above in connection with FIG. 3, the converted audio signals are switched through audio switch 438 and then to FireWire® controllers 434. Each audio stream occupies one transmit (TX) and one receive (RX) port on switch 438.

Once through audio switch 438, the converted audio signals are then passed, using interconnections 414 and 416, respectively, to both programmable multimedia controller 400 and to an additional audio expansion unit 408. In this fashion, all audio signals which originate from an audio source which is physically connected to expansion unit 406 are made available to each other expansion unit and controller which is interconnected with unit 406. Similarly, in controller 400, converted audio signals received on interconnection 414 pass through audio switch 444 and may either be output through audio output module 446 or passed through interconnect 418 to controller 402. Thus, viewed at a system level, any audio signal originating at any expansion unit or controller, is made available to every other interconnected expansion unit or controller for output and pass through as desired.

A Mac computer 448 and optional redundant Mac computer 450 serve as the processing subsystem 240 (FIG. 2) of programmable multimedia controller 400. Mac computer 448 also serves as the master on the FireWire® network within zone 1. To avoid conflict regarding which device is the master of the FireWire® network, there is preferably only one programmable multimedia controller per zone or only one such controller for all zones in a given system.

Figure 6:
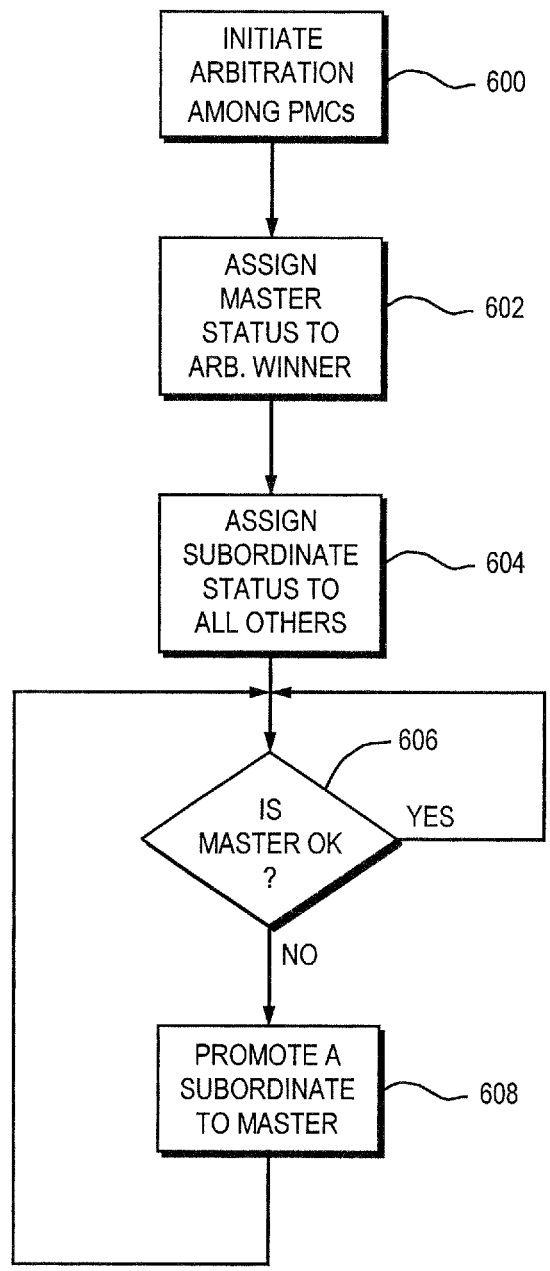
FIG. 6 is a flowchart showing a method for assigning master status to a programmable multimedia controller.

FIG. 6 shows a method for determining which one of multiple programmable multimedia controllers present in a system should be assigned audio switching master status. First, all programmable multimedia controllers participate in an arbitration 600. A variety of conventional arbitration techniques may be suitable. Whichever controller wins the arbitration is assigned audio switching master status 602 and all other controllers are assigned subordinate status 604. At step 606, the audio switching master controller is periodically checked to confirm that it is functioning properly. Should a failure occur, a different controller, previously assigned subordinate status, is promoted to audio switching master status 608 so that system operation may continue.

Once assigned audio switching master status, that multimedia controller may become responsible for passing control information to other controllers in the same or other zones to effect necessary audio switching functions. For example, the audio switching master controller may maintain a conventional map or database, well known in the art of telecommunications switching, which indicates which audio switching paths are available and which are in use across the system.

Figure 7:
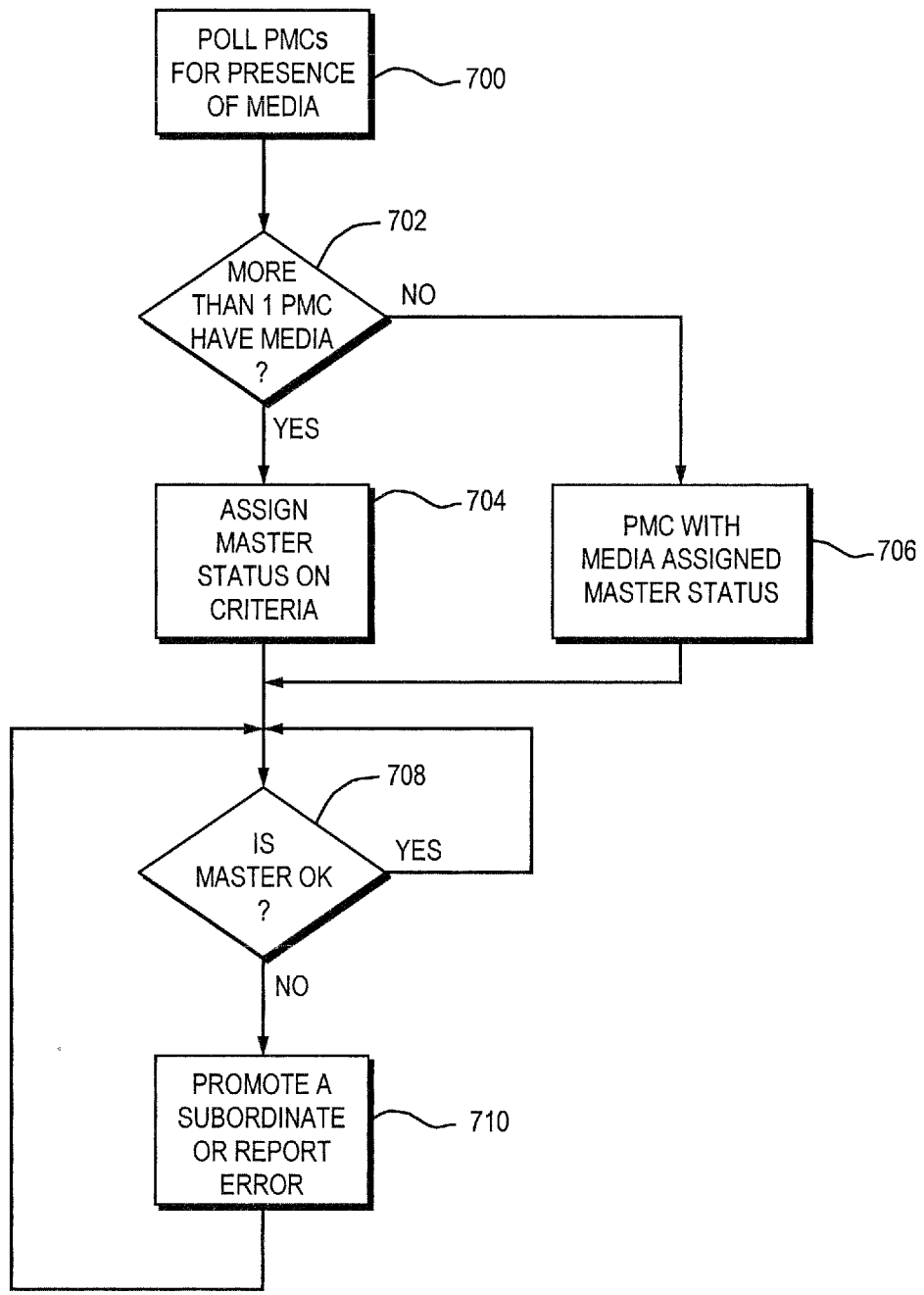
FIG. 7 is a flowchart showing an alternative method for assigning master status to a programmable multimedia controller.

FIG. 7 shows an alternative method for assigning audio switching master status to a controller in a system where multiple controllers are present. At step 700, all programmable multimedia controllers are polled to determine where media, such as digital audio, may be present. At step 702, a determination is made whether media is present at more than one controller. If not, at step 706, the controller at which the media is physically stored is assigned audio switching master status. Alternatively, at step 704, one controller is assigned audio switching master status based on desired criteria such as load balancing, overall system performance or other factors. At step 708, the audio switching master controller is periodically checked to confirm that it is functioning properly. Should a failure occur, a different controller is promoted to master status 710 or an error reported.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. An expandable entertainment system having a distributed switching arrangement comprising:
    a first programmable multimedia controller having a processing subsystem, a first crosspoint audio switch, one or more audio input modules, one or more audio output modules, and one or more ports which support IEEE 1394 serial communication protocol; and
    a first expansion unit interconnected with the first programmable multimedia controller by an IEEE 1394 communication link and having a second crosspoint audio switch,
    at least one second programmable multimedia controller or second expansion unit interconnected with the first expansion unit by an IEEE 1394 communication link and having a third crosspoint audio switch,
    wherein the first programmable multimedia controller is configured to pass a digital audio stream originating from the first programmable multimedia controller to the at least one second programmable multimedia controller or second expansion unit, by the first programmable multimedia controller being configured to switch the digital audio stream with the first audio crosspoint switch and transmit the digital audio stream point-to-point to the first expansion unit, which is in turn configured to switch the digital audio stream with the second audio crosspoint switch and transmit the digital audio stream point-to-point to the at least one second programmable multimedia controller or second expansion unit, and
    wherein the at least one second programmable multimedia controller or second expansion unit is configured to pass a digital audio stream originating from the at least one second programmable multimedia controller or second expansion unit to the first programmable multimedia controller, by the second programmable multimedia controller or second expansion unit being configured to switch the digital audio stream with the third audio crosspoint switch and transmit the digital audio stream point-to-point to the first expansion unit, which is in turn configured to switch the digital audio stream with the second audio switch and transmit the digital audio stream point-to-point to the first programmable multimedia controller.

2. The system as in claim 1, wherein the at least one second programmable multimedia controller or second expansion unit is a second programmable multimedia controller.

3. The system as in claim 1, wherein an audio output device is coupled to the first crosspoint audio switch and the audio output device is configured to output a digital audio stream originating from the first programmable multimedia controller.

4. The system as in claim 1, wherein an audio output device is coupled to the first crosspoint audio switch and the audio output device is configured to output a digital audio stream originating from the first expansion unit.

5. The system as in claim 1, wherein an audio output device is coupled to the first crosspoint audio switch and the audio output device is configured to output a digital audio stream originating from the at least one second programmable multimedia controller or second expansion unit.

6. The system as in claim 1, wherein an audio output device is coupled to the second crosspoint audio switch and the audio output device is configured to output a digital audio stream originating from the first programmable multimedia controller.

7. The system as in claim 1, wherein an audio output device is coupled to the second crosspoint audio switch and the audio output device is configured to output a digital audio stream originating from the first expansion unit.

8. The system as in claim 1, wherein an audio output device is coupled to the second crosspoint audio switch and the audio output device is configured to output a digital audio stream originating from the at least one second programmable multimedia controller or second expansion unit.

9. The system as in claim 1, wherein a device which is a source of digital audio is coupled to at least one of the first programmable multimedia controller, the first expansion unit, and the at least one second programmable multimedia controller or second expansion unit.

10. The system as in claim 1, wherein two or more of the first programmable multimedia controller, the first expansion unit, and the at least one second programmable multimedia controller or second expansion unit, are interconnected by an Ethernet link.

11. An expandable entertainment system having a distributed switching arrangement comprising:
    a first programmable multimedia controller having a processing subsystem, a first crosspoint audio switch and one or more ports;
    an intervening programmable multimedia controller or intervening expansion unit having a second crosspoint audio switch, and interconnected with the first programmable multimedia controller by a first communication link; and
    a second programmable multimedia controller or second expansion unit, interconnected with the intervening programmable multimedia controller or expansion unit by a second communication link, and having a third crosspoint audio switch,
    wherein the first programmable multimedia controller is configured to pass a digital audio stream from the first programmable multimedia controller to the second programmable multimedia controller or second expansion unit, by the first programmable multimedia controller being configured to switch the digital audio stream with the first audio crosspoint switch and transmit the digital audio stream point-to-point to the intervening programmable multimedia controller or intervening expansion unit, which is in turn configured to switch the digital audio stream with the second crosspoint audio switch and transmit the digital audio stream point-to-point to the second programmable multimedia controller or second expansion unit, and wherein the second programmable multimedia controller or second expansion unit is configured to pass a digital audio stream from the second programmable multimedia controller or second expansion unit to the first programmable multimedia controller, by the second programmable multimedia controller or second expansion unit being configured to switch the digital audio stream with the third audio crosspoint switch and transmit the digital audio stream point-to-point to the intervening programmable multimedia controller or intervening expansion unit, which is in turn configured to switch the digital audio stream with the second crosspoint audio switch and transmit the digital audio stream point-to-point to the first programmable multimedia controller.

12. The system as in claim 11, wherein at least one of the first communication link and the second communication link supports IEEE 1394 serial communication protocol.

13. The system as in claim 11, wherein the second programmable multimedia controller or second expansion unit is a second programmable multimedia controller.

14. The system as in claim 11, wherein an audio output device is coupled to the first crosspoint audio switch and the audio output device is configured to output a digital audio stream originating from the first programmable multimedia controller.

15. The system as in claim 11, wherein an audio output device is coupled to the first crosspoint audio switch and the audio output device is configured to output a digital audio stream originating from the intervening programmable multimedia controller or intervening expansion unit.

16. The system as in claim 11, wherein an audio output device is coupled to the first crosspoint audio switch and the audio output device is configured to output a digital audio stream originating from the second programmable multimedia controller or second expansion unit.

17. A method for operating an expandable entertainment system having a distributed switching arrangement comprising:

coupling a first programmable multimedia controller, having a first crosspoint audio switch, to an intervening programmable multimedia controller or intervening expansion unit, having a second crosspoint audio switch, by a first communication link;

coupling the intervening programmable multimedia controller or intervening expansion unit to a second programmable multimedia controller or second expansion unit, having a third crosspoint audio switch, by a second communication link;

passing a digital audio stream from the first programmable multimedia controller to the second programmable multimedia controller or second expansion unit, by switching the digital audio stream with the first crosspoint audio switch of the first programmable multimedia controller;

transmitting the digital audio stream point-to-point to the intervening programmable multimedia controller or intervening expansion unit, switching the digital audio stream with the second crosspoint audio switch of the intervening programmable multimedia controller or intervening expansion unit, and transmitting the digital audio stream from the intervening programmable multimedia controller or intervening expansion unit point-to-point to the second programmable multimedia controller or second expansion unit; and passing a digital audio stream from the second programmable multimedia controller or second expansion unit to the first programmable multimedia controller, by switching the digital audio stream with the third crosspoint audio switch of the second programmable multimedia controller or second expansion unit;

transmitting the digital audio stream point-to-point to the intervening programmable multimedia controller or intervening expansion unit, switching the digital audio stream with the second crosspoint audio switch of the intervening programmable multimedia controller or intervening expansion unit, and transmitting the digital audio stream from the intervening programmable multimedia controller or intervening expansion unit point-to-point to the first programmable multimedia controller.

18. The method of claim 17 wherein at least one of first communication link and the second communication link supports IEEE 1394 serial communication protocol.

* * * * *